United States Patent [19]

Schneider et al.

[11] 4,439,281

[45] Mar. 27, 1984

[54] PROCESS FOR PRODUCING A STABLE CONNECTION BETWEEN AN ELECTRODE STRUCTURE MADE FROM A METALLIZED BODY OF A FIBROUS NATURE AND A CURRENT LEAD OUT TAB

[75] Inventors: Claus Schneider, Fellbach; Gabor Benczur-Ürmössy, Stuttgart, both of Fed. Rep. of Germany

[73] Assignee: Deutsche Automobilgesellschaft, Mettingen, Fed. Rep. of Germany

[21] Appl. No.: 435,700

[22] Filed: Oct. 21, 1982

[30] Foreign Application Priority Data

Oct. 23, 1981 [DE] Fed. Rep. of Germany ....... 3142091

[51] Int. Cl.³ .......................................... H01M 10/44
[52] U.S. Cl. .................................... 204/2.1; 429/211; 29/877; 29/879
[58] Field of Search .................. 204/2.1, 49; 429/211; 29/877, 879

[56] References Cited

U.S. PATENT DOCUMENTS

| | | | |
|---|---|---|---|
| 2,515,204 | 7/1950 | Evans | 429/211 |
| 3,560,262 | 2/1971 | Baba et al. | 429/211 |
| 3,579,385 | 5/1971 | Feduska | 204/2.1 |
| 3,899,350 | 8/1975 | Jackovitz et al. | 204/2.1 |

*Primary Examiner*—John F. Niebling
*Attorney, Agent, or Firm*—Craig & Burns

[57] ABSTRACT

Electrode structures made from metallized bodies of a fibrous nature, for example from metallized felt, possess the advantage, deriving from their intrinsic stiffness, of requiring no internally fitted supporting structure. It is, however, difficult to attach the current lead-out tabs to an electrode structure of this type, because it is hightly susceptible to mechanical damage at the point of attachment. These difficulties are avoided, according to the present invention, when the edge of the electrode structure is reinforced, to a width of about 0.3 to about 1 cm, by means of an electrodeposited metal coating. If appropriate, the reinforcement of the edge can also be carried out simultaneously with the production, by electrodeposition, of the electrode structure. The current lead out-tab can be attached to the reinforced edge avoiding such difficulties.

14 Claims, No Drawings

PROCESS FOR PRODUCING A STABLE CONNECTION BETWEEN AN ELECTRODE STRUCTURE MADE FROM A METALLIZED BODY OF A FIBROUS NATURE AND A CURRENT LEAD OUT TAB

TECHNICAL FIELD

Porous metallic bodies are employed in battery technology. Devices for supporting a known active composition for a battery are exemplary. These supporting structures are impregnated with the active composition using conventional processes. Impregnation and electrodeposition are typical of such processes.

BACKGROUND ART

In batteries with electrodes of this type, a problem arises when conducting the current from the supporting structure to a battery terminal. A current tab or current lead out plate conducts current from the structure to the terminal. Conventional structural bodies are made from sintered metal powder and contain a metal carrier, which projects from the sintered structure at one edge. Perforated plates, expanded metal or metal networks are used as carriers. The current lead out tab can be attached to that portion of the carrier which projects from the sintered structure. Electric spot welding or roll welding are methods of attachment.

Metallized bodies of a fibrous nature are particularly suitable as electrode structures due to their high porosity. An electrode structure made from a metallized felt is illustrative because it exhibits a porosity of approximately 85%.

The body forming the electrode structure is produced by electrodepositing a sufficiently thick metal coating, for example of Ni or Cu, onto an electrically conductive textile body. The conductive textile body can be a carbon fiber felt, a material woven from carbon fibers or a textile such as felt, a woven material or a fibrous web. This textile is metallized using conventional PVD or CVD vapor deposition techniques or by using a conventional chemical process not involving electric current. See German Pat. Nos. 2,251,160 and 2,418,742, which are hereby incorporated by reference.

The structural bodies, produced in this way, require no metal carrier, such as expanded metal or perforated plate carrier. These structural bodies exhibit good intrinsic stability and good current carrying capacity. Due to the high porosity of the metal fiber structures, attachment of the current tab directly to the supporting structure by spot welding, seam welding by rollers, or by riveting is difficult because the structural body is substantially compressed where the support and tab are joined during the welding or riveting operation. Also, there is the danger of fiber breakage near the connection so that both the mechanical integrity of the connection and its current transfer capabilities are degraded.

The present invention seeks to overcome the disadvantages of the prior art. Thus, the object of this invention is to provide a process which enables current tabs to be securely connected to a highly porous structural body, while simultaneously ensuring that these connections retain their mechanical integrity and current capability by having low electrical transition resistance.

These and other objects, features and advantages of the present invention will become more apparent from the following description when taken in connection with the accompanying examples which show for purposes of illustration only an embodiment in accordance with the present invention.

SUMMARY OF THE INVENTION

This discovery relates to a process for producing a stable connection between a porous electrode structure, which can be made from a metallized body of a fibrous nature and a current lead-out tab for a battery. The process is characterized in that one edge of the electrode structure, to which the current tab is attached, is reinforced by an electrodeposited metal coating.

DISCLOSURE OF THE INVENTION

This discovery is directed to an electrode structure with an edge reinforced by an electrodeposited metal coating, and the current lead-out tab is attached to this edge.

BEST MODE FOR CARRYING OUT THE INVENTION

The edge of a finished electrode structure is dipped into an electrolyte bath, to a desired depth, and is metallized by electrodeposition, until it possesses a stability which is sufficient for the attachment of the current lead-out tab. This occurs when the metal coating is adjusted, near the edge, so that about 10 to about 25% of the pore volume is filled with metal. The composition of the baths for electrodeposition are known. The metal, which is also contained within the remainder of the structural body, is applied in order to reinforce the edge. Occasionally, however, it is also advantageous to apply another metal to the edge. For example, this other metal can be less expensive than the former metal of the structural body. The other metal can also be applied to confer specific properties to the edge, for example, improved weldability or enhanced chemical resistance.

The edge of the structural body is reinforced, by electrodeposition, to a width which permits the attachment of the current lead-out tab. The edge preferably has a width of about 0.3 to about 1.0 cm. When a wire is used as the current lead-out tab, the edge width has a reinforcement width of about 0.3 cm. The edge is wider, that is, equal to or greater than about 0.5 cm, when thin metal strips are used as current lead-out tabs.

Alternatively, the reinforced edge of the structural body can be made during the electrodeposition operation rather than subsequent to it. In order to produce the structural body during the electrodeposition operation, a conductive plate-shaped textile body is furnished with a metal coating having an adequate thickness. During the electrodeposition process onto a plate, the metal is not usually deposited uniformly over its surface. Rather, an increase in the local current density occurs at the edges of the plate, this increased current density producing, in turn, a thickened metal coating at these points. This increase in the local current density can be exploited in order to produce an electrolytically reinforced edge because the magnitude of the increase depends on the geometry of the electrodeposition bath, the nature of the electrolyte and the current intensity. These relationships are known to persons skilled in the art; and are described, for example, in "Handbuch der Galvanotechnik (Electroplating Handbook)", Vo. I/1, page 136 et seq., Dettner-Elze, published by C. Hanser Verlag, Munich 1963, which is hereby incorporated by reference. If, for example, a felt having the dimensions 36×40 cm and a thickness of 4.5 mm is nickel-plated, freely suspended in the bath (clear of the walls), the edge effect results in a local nickel coating amounting to approximately 800 mg/cm$^2$ at the edges, associated with an average nickel coating amounting to 240 mg/cm$^2$ in the center of the surface. This thickened coating is concentrated essentially over a strip having a width of 0.5 to 1 cm, measured from the outside edge of the plate. The average plate coating is reestablished at a distance of as little as about 2 cm from the edge.

This heavily nickel-plated edge of the structural plate can be utilized to attach the current tab to the fibrous metal structure.

In addition, it is possible to first apply an edge reinforcement to a comparatively large plate and then to divide this plate into smaller supporting structures. The large plate is advantageously divided in such a manner that each smaller structure possesses at least one reinforced edge, to which the current lead-out tab is attached.

The attachment of the current lead-out tab can be carried out by a technique whereby it is positioned on the reinforced edge of the plate, at the side, overlapping the structure to the desired width, for example by about 5 mm. The connection between the fibrous structure and the current tab can be produced, without difficulty, by spot welding, seam welding by rollers or riveting. Also, in some circumstances, the tab can be soldered because the thickened metal coating in the connection zone of the fibrous metal structure prevents the latter from being excessively compressed and hence prevents the fibers from breaking. In addition, the current tab can be fitted in a manner whereby a slit, about 5 mm deep, is made longitudinally in the reinforced edge of the plate, and the current lead-off tab is inserted into this fissure. The connection is then made, in the same way, by welding, riveting or soldering. Welding and riveting are preferred connection techniques.

EXAMPLE

A plate, having the dimensions 40×40 cm and 2 mm thick, composed of carbon fiber felt, is provided, in a 10-hour electrodeposition process, in a nickel electroplating bath, with a nickel coating amounting to 100 mg/cm$^2$, during which process virtually all the fibers are sheathed with nickel. A piece 14×14 cm, is cut from the middle of the plate and, in order to effect the edge reinforcement, one of its edges is dipped into a nickel bath, to a depth of 0.5 cm. The immersed portion, 14 cm long by 0.5 cm wide, is nickel plated for 30 minutes, at a current of 2.8 A, and is thereby reinforced. The coating in the treated edge zone now amounts to approximately 300 mg/cm$^2$, approximately 17% of the pore volume being filled with nickel. After washing and drying, a nickel tab, made of 1.0 mm sheet, is attached to the plate by spot welding, the plate and the tab overlapping over a length of 14 cm, and over a width of 0.5 cm.

On being loaded, by the application of a bending stress of $\sigma_b = 890$ N/cm$^2$, the tab broke off in the region of the spot of welded zone.

COMPARISON EXAMPLE

The example was repeated, but the edge of the plate was not reinforced, by electrodeposition, prior to attaching the nickel tab. The nickel tab broke off at a stress $\sigma_b$ of as little as 190 N/cm$^2$.

While we have shown and described an embodiment in accordance with the present invention, it is understood that the same is not limited thereto but is susceptible of numerous changes and modifications as known to those skilled in the art and we therefore do not wish to be limited to the details shown and described herein, but intend to cover all such changes and modifications as are encompassed by the scope of the appended claims.

We claim:

1. A process for producing a stable connection between an electrode structure, made from a metallized body of a fibrous nature, and a current lead-out tab, comprising reinforcing one edge of the electrode structure by means of an electrodeposited metal coating and attaching the current lead-out tab to this edge.

2. The process according to claim 1 wherein the edge is reinforced to a width of about 0.3 to about 1.0 cm.

3. The process according to claim 1 wherein a metal coating amounting to about 10 to about 25% of the pore volume is obtained in the edge region.

4. The process according to claim 1 wherein the reinforcement, by electrodeposition, of the edge is carried out simultaneously with the production, by electrodeposition, of the electrode structure.

5. The process according to claim 1 wherein the current leadout tab is attached to the reinforced edge by welding or riveting.

6. The process according to claim 1 wherein the reinforced edge is slit and the current lead-out tab is anchored in the opening formed.

7. A process for connecting a current lead-out tab to an electrode structure for a battery comprising:
   (a) impregnating a porous metallic body with an active composition;
   (b) reinforcing the edge of the impregnated porous body using an electrodeposited metal coating until the edge possesses sufficient stability to attach a current lead-out tab; and
   (c) connecting the current lead-out tab to the impregnated porous body;
wherein the current lead-out tab is connected to an electrode structure so that intrinsic stability and current-carrying capacity are not degraded due to the connection.

8. The process according to claim 7 further comprising dipping the edge into an electrolyte bath subsequent to the impregnation.

9. The process according to claim 7 further comprising simultaneously impregnating the porous body and reinforcing its edge.

10. A process for connecting a current lead-out tab to an electrode structure for a battery comprising:
   (a) impregnating a porous metallic body with an active composition;
   (b) reinforcing the edge of the impregnated porous body using an electrodeposited metal coating to a width of about 0.3 to about 1.0 cm so that the edge possesses sufficient stability to attach a current lead-out tab; and
   (c) coating the edge of the impregnated porous body to about 10 to about 25% of the pore volume; and
   (d) connecting the current lead-out tab to the impregnated porous body;
wherein the current lead-out tab is connected to an electrode structure so that intrinsic stability and current-carrying capacity are not degraded due to the connection.

11. The process according to claim 10 further comprising dipping the edge into an electrolyte bath subsequent to the impregnation.

12. The process according to claim 10 further comprising simultaneously impregnating the porous body and reinforcing its edge.

13. The process according to claim 10 further comprising attaching the current lead-out tab to the reinforced edge by welding or riveting.

14. The process according to claim 10 further comprising slitting the reinforced edge and anchoring the current lead-out tab in the opening formed.

* * * * *